United States Patent [19]

Brambach

[11] Patent Number: 5,374,383
[45] Date of Patent: Dec. 20, 1994

[54] METHOD OF FORMING AN ARTICLE CONSISTING OF A FOAM CORE AND ONE OR MORE COVERING LAYERS

[75] Inventor: Johan A. Brambach, Leimuiden, Netherlands

[73] Assignee: Schreiner Luchtvaart Groep B.V., Leiden, Netherlands

[21] Appl. No.: 721,316

[22] Filed: Jun. 26, 1991

[30] Foreign Application Priority Data

Jul. 4, 1990 [NL] Netherlands ............... 9001522

[51] Int. Cl.⁵ .................. B29C 67/22; B29C 43/10
[52] U.S. Cl. ............................... 264/46.5; 264/40.3;
264/45.1; 264/46.4; 264/53; 264/54; 264/257;
264/510; 264/570
[58] Field of Search ........... 264/257, 258, 40.3,
264/46.5, 46.4, 45.1, 54, 510, 570, 53

[56] References Cited

U.S. PATENT DOCUMENTS

| | | |
|---|---|---|
| 4,136,220 | 1/1979 | Olabisi . |
| 4,247,515 | 1/1981 | Olabisi ............................ 264/46.6 |
| 4,255,368 | 3/1981 | Olabisi ............................ 264/45.5 |
| 4,422,988 | 12/1983 | Kornylak ......................... 264/40.3 |
| 4,532,094 | 7/1985 | Wu et al. ......................... 264/53 |
| 4,598,104 | 1/1986 | Krutchen et al. ................ 264/53 |
| 4,826,723 | 5/1989 | Brambach ........................ 428/284 |
| 4,938,819 | 7/1990 | Ishii et al. ....................... 264/46.4 |
| 4,980,389 | 12/1990 | Hill et al. ........................ 525/183 |
| 5,032,443 | 7/1991 | Ritedijk et al. ................. 264/321 |
| 5,093,053 | 3/1992 | Eckardt et al. ................. 264/570 |

FOREIGN PATENT DOCUMENTS

| | | |
|---|---|---|
| 0173382 | 3/1986 | European Pat. Off. . |
| 0202379 | 11/1986 | European Pat. Off. . |
| 0345855 | 7/1991 | European Pat. Off. . |
| 0268148 | 12/1991 | European Pat. Off. . |
| 2256021 | 7/1975 | France . |
| 1226135 | 3/1971 | United Kingdom . |
| WO83/02599 | 8/1983 | WIPO . |
| WO85/04131 | 9/1985 | WIPO . |

Primary Examiner—Allan R. Kuhns
Attorney, Agent, or Firm—Burns, Doane, Swecker & Mathis

[57] ABSTRACT

A method of forming in a mould an article using a thermoplastic sandwich material, which material has a core of a thermoplastic foam and one or two, optionally fiber-reinforced, covering layers of a thermoplastic resin, the method having the steps of providing in the mould a foamable thermoplastic synthetic material and said one or two fiber-reinforced covering layers, supplying a liquid to the mould at an elevated pressure and temperature, whereby the temperature of the thermoplastic synthetic material is raised to a temperature above the temperature at which the material foams, followed by lowering the pressure of the liquid and removing the liquid from the mould with foaming of the thermoplastic synthetic material.

20 Claims, No Drawings

METHOD OF FORMING AN ARTICLE CONSISTING OF A FOAM CORE AND ONE OR MORE COVERING LAYERS

This invention relates to a method of forming an article consisting of a foam core and one or more covering layers.

In European patent application 264,495 articles are described that are made from thermoplastic foam materials and more particularly sandwich constructions consisting of a core of a thermoplastic foam and two top layers or covering layers. Such materials are of great importance for various applications, for example in the aircraft, automobile and aerospace industry, since they combine a light weight with great strength and rigidity and in certain cases also with good fire-proofing effect.

It is also possible to utilize such materials in the manufacture of non-planar articles using the techniques set forth in European patent application 268.148. It turns out, however, there is one category of articles that can be manufactured only in a very laborious manner, if at all, namely articles that have different types of shape on opposite sides. Using thermoplastic sandwich materials, it is possible to form specific shapes, but the limitation remained that the two opposite sides should have the same or a complementary form.

It has also been possible heretofore, to manufacture an article of which one side is flat while the other is of a different shape. Such articles are manufactured by supplying a foamable material to a mould and applying heat. For a proper heat transfer it is necessary that one side is flat.

In thermoplastic sandwich materials, however, there is a need for articles whose two opposite sides have a different shape and which, therefore, cannot be manufactured with the prior art technique.

It is one object of the invention to provide a method of the type described in the preamble, wherein there are no such limitations and which enables articles of complex shade to be manufactured in a simple manner.

The invention relates to a method of forming in a mould an article consisting of a thermoplastic sandwich material, which material comprises a core of a thermoplastic foam and one or two, optionally fibre-reinforced, covering layers of a thermoplastic resin, comprising providing in the mould a foamable thermoplastic synthetic material and said one or two fibre-reinforced covering layers, supplying a liquid to the mould at an elevated pressure and temperature, whereby the temperature of the thermoplastic synthetic material is raised above the temperature at which the material foams, followed by lowering the pressure of the liquid and removing the liquid from the mould with foaming of the thermoplastic synthetic material. If desired, the material may subsequently be cooled.

Surprisingly, it has been found that using this method, articles can be made whose two sides may have mutually different, non-complementary shapes. Moreover, this method makes it possible to control the degree of foaming over time. It has been found that thus the properties of the final product can be favourably influenced.

Using the method according to the invention, the shape of the article can be chosen to be any desired shape, limited only, if at all, by the mould constructions. Using the method according to the invention, articles can be made of which both sides are flat. It is also possible, however, to keep one side flat and to give one side a different shape. A third possibility is that both sides are shaped, but that the covering layers are nevertheless parallel to each other. These articles could already be made using the known methods. Using the method according to the invention, however, better properties are obtained. Finally, the method according to the invention also enables articles to be made of which neither side is flat and each is of completely different shape. This class of articles could heretofore be made only in a very laborious manner, if at all.

The article is formed from a core of a thermosplastic synthetic foam and at least one covering layer. Preferably two covering layers are employed.

The method according to the invention can be practiced in existing apparatus without much trouble, since the only requirement is the provision of a mould which is provided with means for supplying to and discharging from the product cavity a heated liquid under pressure, within a certain time.

The method could for example be practiced as follows. The foamable thermoplastic synthetic material is introduced into the mould together with one or two covering layers. In principle, this is understood to mean that the material is inserted into the mould in the form of a pre-formed sheet or foil. The covering layers may already be bonded to the foamable material, so that a multi-layer whole is inserted into the mould. It is also possible, however, to introduce loose layers into the mould, for them to be bonded together under the influence of the process. The mould is closed and the liquid is introduced into the mould at elevated pressure and temperature. Generally, from the beginning the temperature of the liquid will be at or above the foaming temperature of the thermoplastic synthetic material. Preferably, the pressure of the liquid, which liquid is generally little compressible, if at all, is initially kept so high that the thermoplastic synthetic material will hardly foam, if at all. It is preferable first to heat the material sufficiently and then to remove the liquid from the mould in a controlled manner. During this step, the material will foam and fill the mould. Normally it will be unnecessary to carry out any special steps for removing the liquid other than lowering the pressure, since a high pressure is already built up in the material due to the heating. Lowering the liquid pressure will then lead to the liquid being pressed from the mould. It is also possible, however, to suck off the liquid, optionally combined with creating a vacuum.

By adjusting the rate at which the liquid is removed from the mould, the properties of the material can be influenced.

The method according to the invention has the advantage that the heat transfer to the material to be foamed takes place by means of the liquid, so that a proper heat transfer to both sides of the material to be foamed is effected. This makes it possible to foam the material into two directions, so that irregularly shaped articles can be formed. Heretofore, it has only been possible to form an article in one pass if either the two covering layers were parallel to each other or one of the covering layers was kept flat so as to obtain sufficient heat transfer. In the first case, the method according to European patent application 268,148 is used. For the second embodiment, the starting product is a flat foil of foamable material, which is heated on one side.

For supplying and discharging the liquid to and from the mould, a plurality of variants can be used. The first and simplest method comprises supplying the liquid to both sides of the material to be foamed and discharging the liquid after some time via the same orifices in the mould. In this connection, it is important that the mould is so constructed and the orifices are so provided that in principle no liquid and/or air inclusion occurs. In this method, the liquid has the proper temperature for achieving the foaming.

According to another variant of the method according to the invention, the mould is provided with separate supply and discharge orifices for the liquid, so that the possibility is provided of employing an accurately defined temperature/time/pressure profile with a continuous flow of liquid, whereby a continuous heat supply is accomplished. This has the advantage that the properties of the final product can be controlled optimally.

The mould may have cooling means, so that after reaching the maximum desired foaming, the surface of an article is rapidly fixated. It is also possible not to cool, to insulate or even to heat the mould. The final choice depends on the materials to be used and the desired final products.

Using the method according to the invention, an article can be formed that consists entirely of a foam, by foaming a foamable material. By employing specific conditions (temperature; time; pressure) during that process, it is also possible to obtain a certain surface structure. This can also be obtained by using a foil with a specific structure, which is provided between foam and mould or a surface treatment of the mould.

According to the invention, an article is formed from a sandwich material. This sandwich material is built up from a core of a thermoplastic foam and preferably two covering layers of thermoplastic synthetic material, which covering layers are preferably fibre-reinforced.

Such articles are entirely thermoplastic and consist of a core material which comprises inter alia a thermoplastic foam and two top layers consisting of a fibre-reinforced, preferably thermoplastic, synthetic material.

According to this embodiment of the method according to the invention, at least one of the covering layers consists of a foil of a thermoplastic synthetic material, which is reinforced with a woven fabric, knitted fabric, fibre web or unidirectionally applied fibres.

In principle, any thermoplastic resin may function as a synthetic base for the foamable material. This thermoplastic resin is preferably selected from the group consisting of polyetherimide, polycarbonate, acrylate polymers, styrene polymers, polyether sulfone, polyether ketone, polyether-ether ketone, polyether ketone-ketone, polyphenylene oxide, polyphenylene sulfide, and mixtures of two or more of these synthetic substances. Any preference is to a large extent determined by the use the article is intended for. For use in fields where a high mechanical load of the materials may occur, or where strict requirements are set as to the fire-retardant properties of the materials, there is a preference for polyetherimide, polycarbonate, polyether sulfone, polyether ketone, polyether-ether ketone, polyether ketone-ketone and mixtures of two or more of these synthetic substances.

For the covering layers the same materials can be used as for the foam.

The blowing agents that are used in the foamable material are in principle the same as described in European patent application 345.855 or in NL patent application 9001215. Examples thereof are solvents for the thermoplastic resin, physical blowing agents, liquid chemical blowing agents, water and mixtures of two or more of these blowing agents. Examples of blowing agents that can be used include mono-, di-, and trichloromethane, lower hydrocarbons, such as butane, pentate, hexane and the like, understood to include the various isomers thereof, cyclic aromatic and aliphatic hydrocarbons, and the like.

When polyetherimide is used as a thermoplastic resin for the foam, it is preferable to start from dichloromethane as a blowing agent, because with this combination optimum results can be obtained.

In the covering layer, the synthetic material may be reinforced with glass fibres, polyamide fibres, such as aramid fibres, polyethylene fibres, polyester fibres and carbon fibres.

According to the simplest embodiment of the invention, the foamable thermoplastic synthetic material consists of two components, namely the resin and the blowing agent. It is not impossible, however, that additives are incorporated in the foil. Examples of such additives are selected inter alia from the group of existing stabilizers, antioxidants, fillers such as fibres and/or liquid crystalline polymers, pigments, flame-retardant additives, other inert additives and mixtures of two or more of the components. Further, a softening agent may be incorporated in the system, the purpose of the softening agent being to lower the temperature at which foaming occurs. In practice, such a softening agent is useful only when no softening of the thermoplastic resin occurs through the presence of a blowing agent for the thermoplastic resin that also acts as a softening agent.

Suitable softeners include the fatty acids and metallic soaps thereof. APP, polybutylene, bitumen, or extender oil such as naphthalenic and paraffinic oil can also be used. For this purpose, it is also possible to use waxes, such as microcrystalline waxes.

In certain cases, it may be advantageous to incorporate fibres into the foam. During softening and foaming of the foam, the fibres can direct themselves and have a reinforcing function. In this case, it is preferable to start from relatively short and thin fibres, for example having a thickness of the order of a few microns, for example 0.5–5 $\mu$m, and a length of some millimeters at most, for example 0.1–3 mm.

The foamable material consists preferably from about 50% to about 59% by weight thermoplastic synthetic material, from about 1% to about 50% by weight blowing agent, and up to about 15% by weight of an additive selected from the group consisting of stabilizers, antioxidants, fillers, pigments, flame-retardant additives, and mixtures thereof.

A foamable foil as described in European patent application 345.855 or in NL patent application 9001215, the disclosure of which is incorporated herein by way of reference, can be used well in the method according to the present invention. It is also possible to use a different foamable material such as grains of a thermoplastic synthetic material which are provided with a blowing agent. This can be placed in the mould in loose form or in the form of a more or less coherent layer.

The foamable thermoplastic foil which according to the invention can be used as material for the foam core, can be produced in different ways. According to a first method, one starts from an already existing, extruded or moulded foil, which is then provided with a liquid physical blowing agent by impregnation of the foil with the liquid or through exposure to the vapour thereof. Since this method is rather laborious, it is not preferred. It is also possible to produce a foil by extruding or otherwise shaping a mixture of the thermoplastic resin, the blowing agent and any other components that may be present. According to a third method—and this method is preferred—the foil can be produced by the method of 'solvent-casting', wherein a solution of the thermoplastic resin is formed as an intermediate layer. Surprisingly, it has been found to be possible to form the intermediate layer by applying (pouring) a solution of the thermoplastic resin to a covering layer, and immediately thereafter providing the other covering layer on the intermediate layer.

In the method of making an article from a foam core with two fibre-reinforced covering layers, the material to be foamed with the covering layers is placed in the mould. The material to be foamed may already be bonded to the covering layers. It is also possible, however, to place loose foils in the mould. The mould is then closed, preferably with the edges of the foils being clamped between the edges of the mould. This offers the advantage that thus a proper sealing of the mould is obtained without it being required that high pressures are applied to the mould.

During foaming—which, as it were, occurs explosively—the covering layers, softened already, are deformed at the same time. When fibre reinforcement in the covering layers is used, it is preferable to use comparatively long fibres. These fibres possess the property of sliding in the synthetic material, so that an optimum reinforcement of the final product is obtained. This holds in particular when employing a woven fabric, unidirectional fibres or a knitted fabric, in which the length of the fibres substantially corresponds to the size of the article.

As a liquid, in principle any inert liquid can be used that is incompressible or substantially so. It is important only that the liquid is inert relative to the materials the liquid comes into contact with, while the liquid must also be resistant to the temperatures and pressures employed. Suitable liquids are water, oil, glycols and the like.

It is possible to place the starting materials directly into the mould and there to bring them into direct contact with the liquid. However, it is also possible and sometimes advantageous to provide a barrier between liquid and article. This can be effected by providing a covering foil between the the article to be formed and the liquid. This could for example be a disposable foil of a thermoplastic synthetic material. In that case, as a synthetic material, a material is preferred whose glass transition temperature is lower and whose melting temperature is higher than the temperature of the liquid. After the article has been shaped, this foil is removed.

Another possibility is providing a membrane or a rubber seal between article and liquid. This separation between liquid and article must be flexible, so that during foaming it is forced against the surface of the mould.

By providing a surface texture on the surface of the mould, by using a textured foil and the like, it is possible to provide a texture on the surface of the article. Naturally, this is also possible by giving the membrane or the covering foil a texture.

The method according to the invention has a number of very clear advantages. In the first place, it is now possible to form in one pass articles from a thermoplastic synthetic foam that heretofore could not be formed. Also, the production time is very short, while the mechanical properties of the article are excellent. This last is partly due to the fact that an oriented foam structure is obtained by the method used.

EXAMPLE 1

A polyetherimide foil which had been provided with approx. 25% by weight of dichloromethane as a blowing agent was arranged between two layers of a glass fabric reinforced polyetherimide. This whole was placed in a mould. In the mould on opposite sides of the assembly, oil was supplied at a pressure of 44 bar and a temperature of 200° C. After 20 sec the pressure was lowered, whereby the polyetherimide foamed forming a sandwich construction. After approx. 10 sec the mould was filled and cooling of the surface occurred via the relatively cold walls of the mould. The material obtained was built up from three layers and possessed the following properties:

Weight: 2.670 kg/m$^2$
Flexural strength 180 N/mm$^2$
Modulus of shear 10 N/mm$^2$

What is claimed is:

1. In a method for forming an article from a thermoplastic sandwich material comprising a core layer of foamable thermoplastic material and at least one covering layer, the steps of:
   (a) placing the sandwich material in a mold and thereafter closing the mold;
   (b) supplying a heated liquid to the mold at a specified temperature and at a specified superatmospheric, hydrostatic pressure higher than that permitting foaming of the sandwich material to occur at the specified temperature;
   (c) contacting the sandwich material with the liquid, thereby heating the sandwich material and subjecting the sandwich material to said specified superatmospheric, hydrostatic pressure, thereby preventing foaming of the sandwich material;
   (d) allowing the sandwich material to foam by reducing the pressure of the liquid to a level sufficient to permit foaming; and
   (e) displacing the liquid as the foaming sandwich material expands to thereby form the article.

2. A method according to claim 1, wherein the core layer includes a cover layer on each side.

3. A method according to claim 1, wherein at least one cover layer contains fiber reinforcement.

4. A method according to claim 1, wherein at least one cover layer is bonded to the core layer.

5. A method according to claim 1, including the step of removing the formed article from the mold and cooling the article.

6. A method according to claim 4, including the step of removing the formed article from the mold and cooling the article.

7. A method according to claim 1, wherein the heated liquid is supplied to the mold in step (b) via one or more orifices in the mold and exits the mold in step (e) via the same orifices.

8. A method according to claim 7, wherein the heated liquid contacts both sides of the sandwich material in the mold.

9. A method according to claim 1, wherein the heated liquid is continuously supplied and constantly discharged during the contacting step (c).

10. A method according to claim 1, wherein the covering layers have edges, and wherein the method includes clamping the edges in the mold prior to supplying liquid to the mold in step (b).

11. A method according to claim 1, wherein the core layer includes fibers.

12. A method according to claim 1, wherein at least one covering layer comprises a thermoplastic resin with fibers embedded therein.

13. A method according to claim 1, wherein at least one of the covering layers is a foil of a thermoplastic resin reinforced with woven fabric, knitted fabric, fiber web or unidirectionally applied fibers.

14. A method according to claim 1, wherein the core comprises a thermoplastic resin selected from the group consisting of polyetherimide, polycarbonate, an acrylate polymer, a styrene polymer, polyether sulfone, polyether ketone, polyether ketone-ketone, polyether-ether ketone, polyphenylene oxide, polyphenylene sulfide, and mixtures thereof.

15. A method according to claim 1, wherein the covering layer or layers comprises a thermoplastic resin selected from the group consisting of polyetherimide, polycarbonate, an acrylate polymer, a styrene polymer, polyether sulfone, polyether ketone, polyether ketone-ketone, polyether-ether ketone, polyphenylene oxide, polyphenylene sulfide and mixtures thereof.

16. A method according to claim 1, wherein the core layer includes a blowing agent selected from the group consisting of solvents for the thermoplastic resin, physical blowing agents, liquid chemical blowing agents, water and mixtures thereof.

17. A method according to claim 16, wherein the core is polyetherimide and the blowing agent is dichloromethane.

18. A method according to claim 1, wherein the core comprises from about 50% to about 59% by weight thermoplastic synthetic material, from about 1% to about 50% by weight blowing agent, and up to about 15% by weight of an additive selected from the group consisting of stabilizers, antioxidants, fillers, pigments, flame-retardant additives, and mixtures thereof.

19. A method according to claim 18, wherein the fillers are selected from the group consisting of fibers, liquid crystalline polymers, and mixtures thereof.

20. A method according to claim 1, wherein said method is a batch method.

* * * * *